(12) United States Patent
Yang et al.

(10) Patent No.: US 11,892,730 B2
(45) Date of Patent: Feb. 6, 2024

(54) BACKLIGHT MODULE, DISPLAY DEVICE AND METHOD OF ASSEMBLING DISPLAY DEVICE

(71) Applicant: HKC CORPORATION LIMITED, Shenzhen (CN)

(72) Inventors: Xiaohui Yang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/218,076

(22) Filed: Jul. 4, 2023

(65) Prior Publication Data

US 2024/0012288 A1 Jan. 11, 2024

(30) Foreign Application Priority Data

Jul. 5, 2022 (CN) .......................... 202210781393.9

(51) Int. Cl.
*G02F 1/13357* (2006.01)
*G02F 1/1333* (2006.01)

(52) U.S. Cl.
CPC .. *G02F 1/133608* (2013.01); *G02F 1/133325* (2021.01)

(58) Field of Classification Search
CPC .................... G02F 1/133608; G02F 1/133325
See application file for complete search history.

(56) References Cited

U.S. PATENT DOCUMENTS

2011/0187957 A1* 8/2011 Kim .................. G02F 1/133325
445/25

FOREIGN PATENT DOCUMENTS

| CN | 103307511 A | 9/2013 |
|---|---|---|
| CN | 104656804 A | 5/2015 |
| CN | 204990232 U | 1/2016 |
| CN | 106950737 A | 7/2017 |
| CN | 107065260 A | 8/2017 |
| CN | 107422538 A | 12/2017 |
| CN | 108594526 A | 9/2018 |
| CN | 111245982 A | 6/2020 |
| CN | 111954404 A | 11/2020 |
| CN | 113391477 A | 9/2021 |
| CN | 113394356 A | 9/2021 |
| CN | 113660796 A | 11/2021 |
| CN | 114397777 A | 4/2022 |
| CN | 114839814 A | 8/2022 |
| JP | 2016139717 A | 8/2016 |

OTHER PUBLICATIONS

Wu, Xiaowei, the ISA written comments, Mar. 2023, CN.
Wu, Xiaowei, the International Search Report, dated Mar. 2023, CN.

* cited by examiner

*Primary Examiner* — Kevin Quarterman

(57) ABSTRACT

A backlight module, a display device, and a method of assembling a display device are disclosed. The backlight module includes a backplate, a middle frame, and a bonding adhesive. The middle frame is disposed on the backplate. A first adhesive holding slot is disposed between the backplate and the middle frame. At least one adhesive passage hole is defined in the middle frame. One end of the at least one adhesive passage hole is connected to the first adhesive holding slot, and another end of the at least one adhesive passage hole defines an opening at a top of the middle frame.

16 Claims, 5 Drawing Sheets

BACKLIGHT MODULE, DISPLAY DEVICE AND METHOD OF ASSEMBLING DISPLAY DEVICE

CROSS-REFERENCE TO RELATED APPLICATIONS

This application is a United States national stage application of co-pending International Patent Application Number PCT/CN2022/137206, filed Dec. 7, 2022, which claims the priority and benefit of Chinese patent application number CN202210781393.9, entitled "Backlight Module, Display Device and Method of Assembling Display Device" and filed Jul. 5, 2022 with China National Intellectual Property Administration, the entire contents of which are incorporated herein by reference.

TECHNICAL FIELD

The present application relates to the field of display technology, and in particular to a backlight module, a display device, and a method of assembling a display device.

BACKGROUND

The description provided in this section is intended for the mere purpose of providing background information related to the present application but doesn't necessarily constitute prior art. With the characteristics of low radiation, light and thin volume and low power consumption, liquid crystal display devices have been widely used in fields such as mobile phones, notebook computers, personal computers and televisions.

The application of laptop computers to online telecommuting or teleconferencing has gradually become a normal working mode, and people can easily and quickly handle daily work at home. With the promotion and popularization of this novel and convenient working mode, the market demand for office notebook computers is also increasing. However, the manufacture and assembly of notebook liquid crystal display devices are complicated at present, and the manpower demand is large, so the cost is high, which seriously restricts its development.

In the assembly design of the notebook liquid crystal display device, the middle frame in the backlight module may be pasted with double-sided tape. It is needed to tear off the release film on one side of the tape in advance, then paste the tape onto the backplate, then tear off the release film on the other side of the tape on the backplate, and finally place the middle frame thereon for bonding and fixing. Such assembly operations are cumbersome, require a lot of manpower, and result in poor stability. In addition, the liquid crystal display panel is also fixed by double-sided tape, which is the same as the fixing method between the middle frame and the backplate, resulting in increased labor costs and low assembly efficiency.

SUMMARY

In view of the above, it is therefore one purpose of the present application to provide a backlight module, a display device, and a method for assembling a display device, which can improve the assembly stability and have high assembly efficiency.

This application discloses a backlight module, including a backplate, a middle frame and a bonding adhesive. The middle frame is disposed on the backplate. A first adhesive holding slot is provided between the backplate and the middle frame. At least one adhesive passage hole is provided in the middle frame, where one end of the adhesive passage hole is connected with the first adhesive holding slot, and the other end forms an opening at the top of the middle frame. The bonding adhesive is arranged in the first adhesive holding slot, in the adhesive passage hole and protrudes from the top surface of the middle frame.

In this application, a first adhesive holding slot is disposed between the backplate and the middle frame, and at least one adhesive passage hole is disposed in the middle frame 120, where one end of the adhesive passage hole is connected with the first adhesive holding slot, and the other end forms an opening at the top of the middle frame. In this way, the middle frame and the backplate can be bonded and fixed by injecting a sufficient amount of adhesive into the first adhesive holding slot. Furthermore, when the middle frame is placed on the backplate for pressing and bonding, the bonding adhesive in the first adhesive holding slot on the backplate flows upward through the adhesive passage hole of the middle frame under the action of extrusion pressure, so as to rise to the opening at the top of the middle frame, and then continues to spread outward, so that the adhesive covers the first adhesive holding slot, the adhesive passage hole and the opening 160 at the top of the middle frame, and the top surface of the adhesive protrudes out. Since later the display panel and the middle frame need to be bonded and fixed together, such a design only needs to apply the adhesive once to fix the middle frame to the backplate, and to fix the display panel to the middle frame. Thus, while simplifying the assembly operations of the backlight module, the assembly automation is realized, the assembly efficiency is improved, and the stability of the assembly is improved.

DETAILED DESCRIPTION OF EMBODIMENTS

Figure 1:
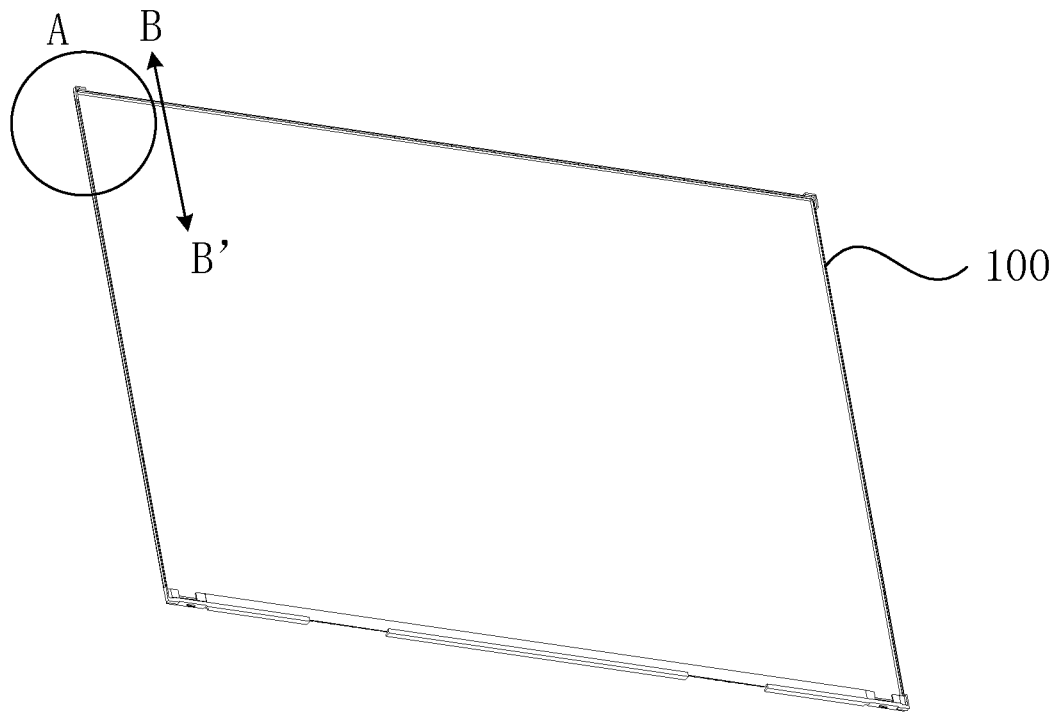
FIG. 1 is a schematic diagram of a backlight module according to the present application.
Figure 2:
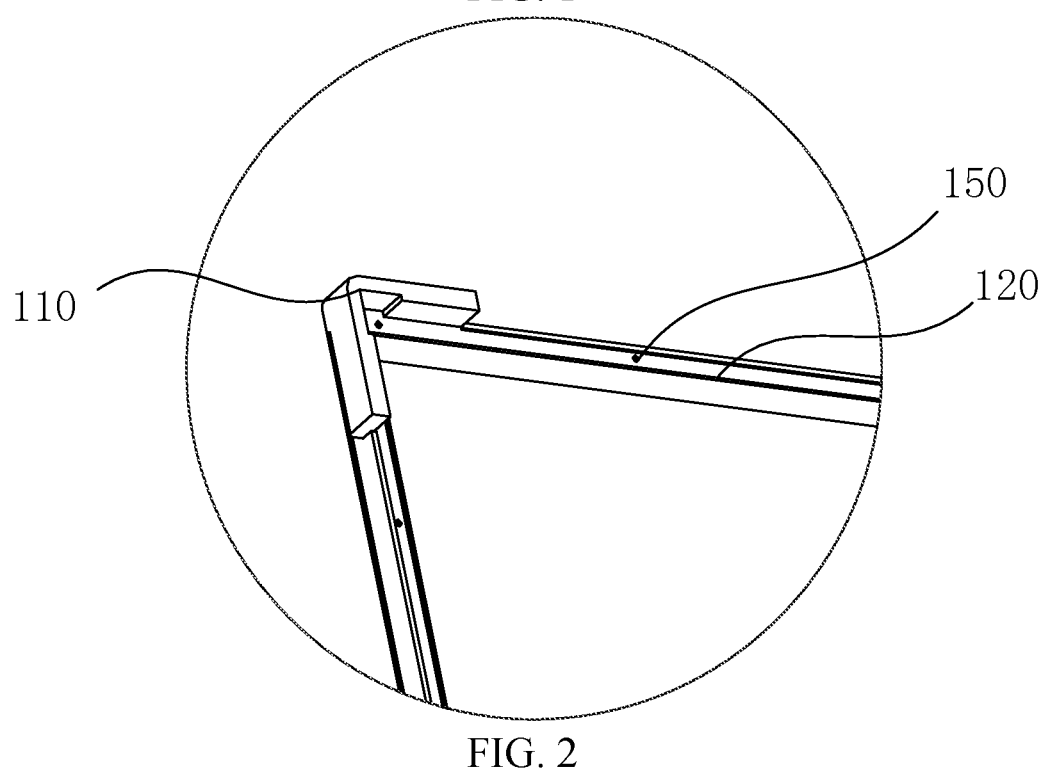
FIG. 2 is a partially enlarged schematic diagram of area A in FIG. 1.
Figure 3:
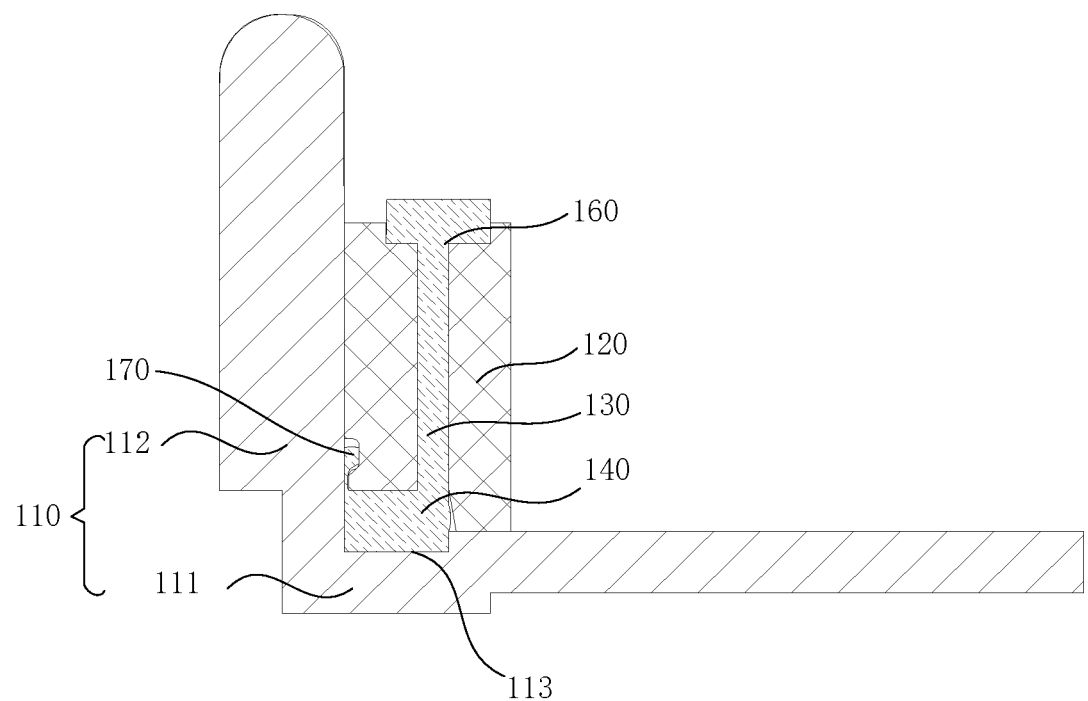
FIG. 3 is a schematic cross-sectional view taken along section line B-B' in FIG. 1.

FIG. 1 is a schematic diagram of a backlight module according to the present application. FIG. 2 is a partially enlarged schematic diagram of area A in FIG. 1. FIG. 3 is a schematic cross-sectional view taken along section line B-B' in FIG. 1. With reference to FIGS. 1-3, the present application discloses a backlight module 100, including a backplate 110, a middle frame 120 and an bonding adhesive 130. The middle frame 120 is arranged on the backplate 110. Between the backplate 110 and the middle frame 120 is provided a first adhesive holding slot 140. At least one adhesive passage hole 150 is defined in the middle frame 120. One end of the adhesive passage hole 150 is connected with the first adhesive holding slot 140, and the other end forms an opening 160 at the top of the middle frame 120. The bonding adhesive 130 is disposed in the first adhesive holding slot 140, inside the adhesive passage hole 150 and protrudes from the top surface of the middle frame 120.

Compared with the solution in which the middle frame 120 and the backplate 110 of the backlight module 100 are fixed together by double-sided adhesive tape, in this application, a first adhesive holding slot 140 is disposed between the backplate 110 and the middle frame 120, and at least one adhesive passage hole 150 is disposed in the middle frame 120, where one end of the adhesive passage hole 150 is connected with the first adhesive holding slot 140, and the other end forms an opening 160 at the top of the middle frame 120. In this way, the middle frame 120 and the backplate 110 can be bonded and fixed by injecting a sufficient amount of bonding adhesive 130 into the first adhesive holding slot 140. Furthermore, when the middle frame 120 is placed on the backplate 110 for pressing and bonding, the bonding adhesive 130 in the first adhesive holding slot 140 on the backplate 110 flows upward through the adhesive passage hole 150 of the middle frame 120 under the action of extrusion pressure, so as to rise to the opening 160 at the top of the middle frame 120, and then continues to spread outward, so that the bonding adhesive 130 covers the first adhesive holding slot 140, the adhesive passage hole 150 and the opening 160 at the top of the middle frame 120. Since later the display panel 400 and the middle frame 120 need to be bonded and fixed together, such a design only needs to apply the bonding adhesive 130 once to fix the middle frame 120 to the backplate 110, and to fix the display panel 400 to the middle frame 120. Thus, while simplifying the assembly operations of the backlight module 100, the assembly automation is realized, the assembly efficiency is improved, and the stability of the assembly is improved.

Figure 4:
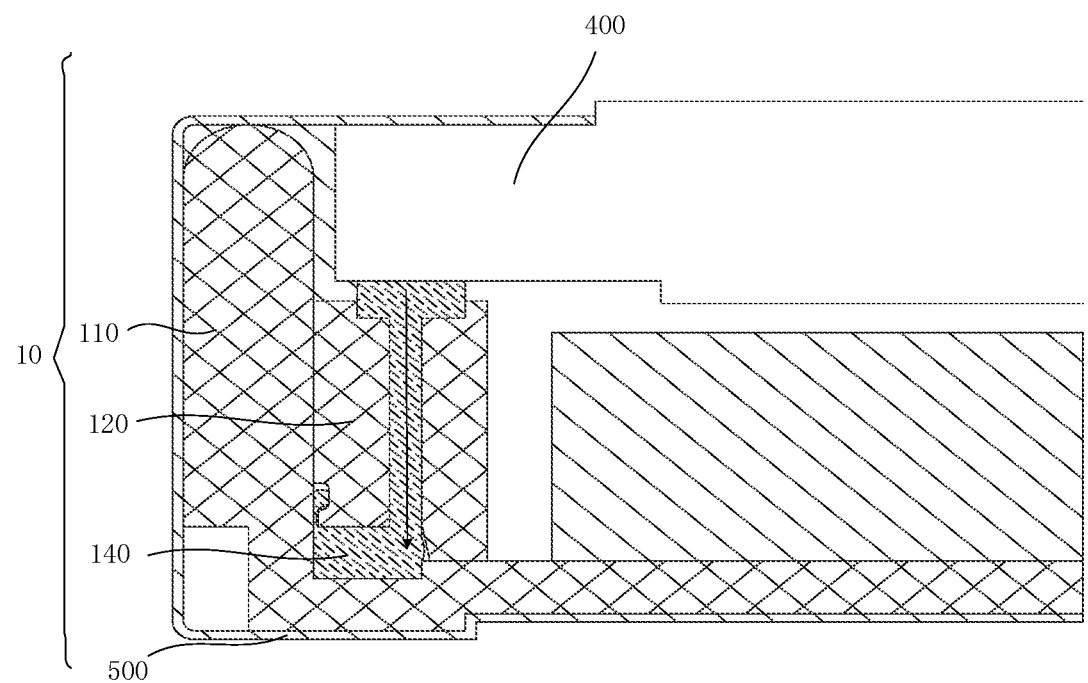
FIG. 4 is a schematic cross-sectional diagram of a display device according to the present application.
Figure 5:
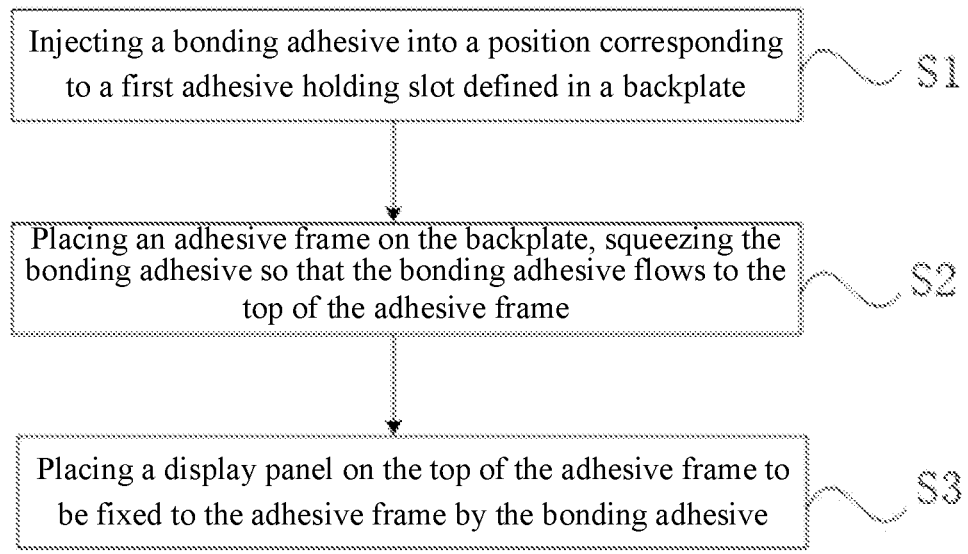
FIG. 5 is a flowchart of an assembly process of a display device according to the present application.

FIG. 4 is a schematic cross-sectional diagram of a display device according to the present application. FIG. 5 is a flowchart of an assembling process of a display device according to the present application. As shown in FIG. 4, the present application further discloses a display device 10 and a method of assembling a display device 10. The display device 10 includes a display panel 400 and the above-mentioned backlight module 100. The display panel 400 is arranged on the top of the middle frame 120 of the backlight module 100, and is bonded and fixed to the middle frame 120 by the bonding adhesive 130. As shown in FIG. 5, the specific assembling steps of the display device 10 are as follows:

S1: injecting adhesive into the position corresponding to the first adhesive holding slot in the backplate;

S2: placing the middle frame on the backplate, squeezing the adhesive, so that the adhesive flows to the top of the middle frame through the adhesive passage hole;

S3: placing the display panel on the top of the middle frame, and bonding and fixing the display panel to the middle frame through the adhesive.

Through such a design, the assembly automation of the display device can be realized, and the assembly efficiency of the display device can be improved. After the display panel is bonded and fixed, a battery tape can also be pasted onto the outer wall of the backplate, and the backplate and the display panel can be bonded and fixed to further strengthen the stability of the entire display device.

Hereinafter the backlight module of the present application will be described in detail below with reference to the accompanying drawings and optional embodiments.

Embodiment 1

Figure 6:
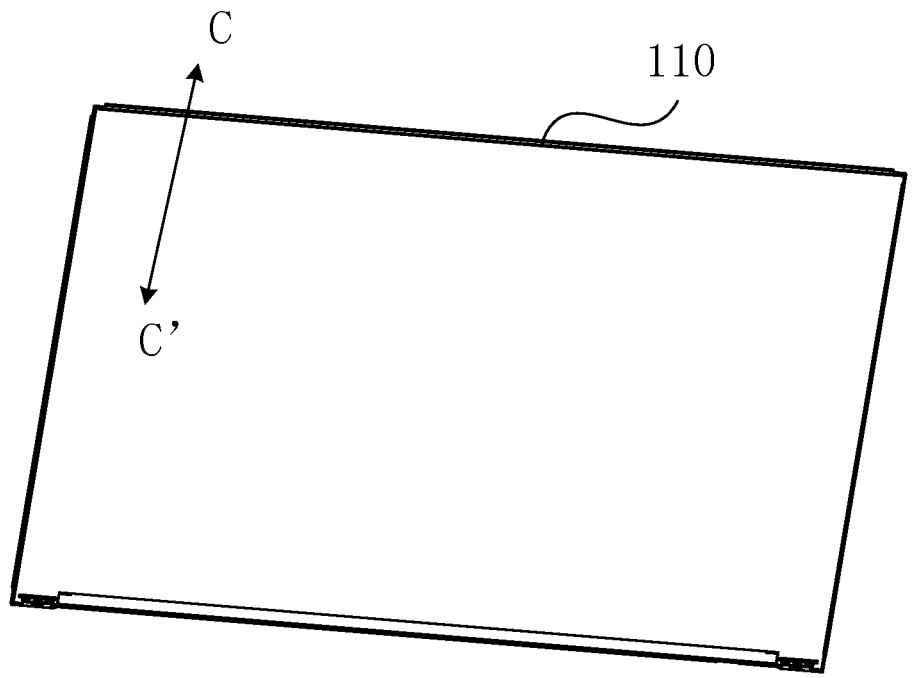
FIG. 6 is a schematic diagram of a backplate provided by a first embodiment according to the present application.
Figure 7:
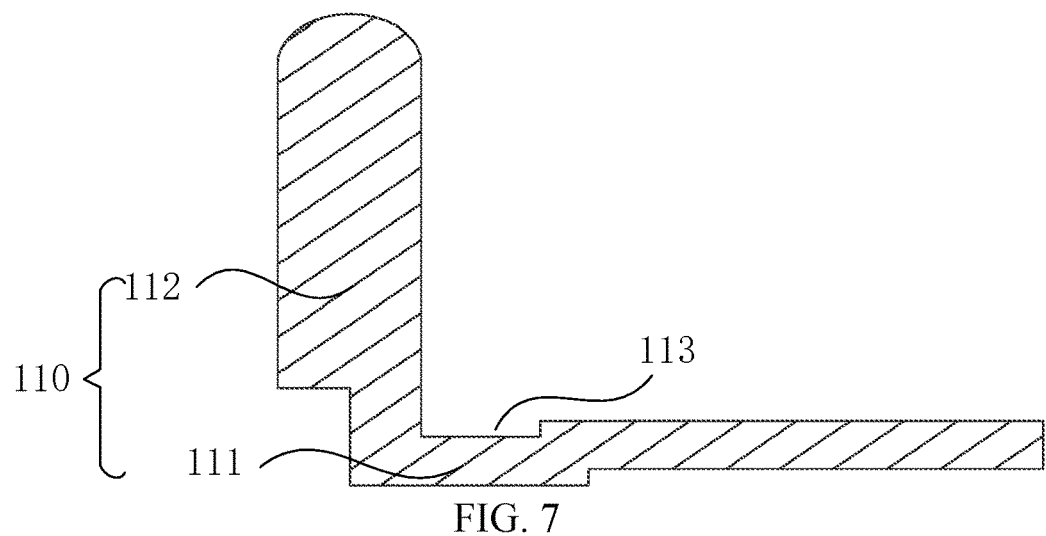
FIG. 7 is a schematic cross-sectional view of the backplate provided by the first embodiment of the present application taken along the section line C-C' in FIG. 5.

FIG. 6 is a schematic diagram of a backplate provided by a first embodiment according to the present application. FIG. 7 is a schematic cross-sectional view of the backplate 110 provided by the first embodiment according to the present application taken along the section line C-C' shown in FIG. 5. With reference to FIGS. 6-7, the backplate 110 includes a bottom plate 111 and a side plate 112. The bottom plate 111 is vertically connected to the side plate 112. The bottom plate 111 is provided with a first slot 113. The side of the middle frame 120 adjoining the bottom plate 111 is provided with a second slot 121. The first slot 113 is arranged corresponding to the second slot 121 to form the first adhesive holding slot 140. The bonding adhesive 130 can adopt silica gel.

Since the fluidity of silicone is relatively poor in a liquid state, if holes are punched in the middle frame and are used to inject adhesive down, it will take a long time for the silicone gel poured in this way to reach the bottom of the backplate, and it is impossible to predict whether it has been injected to the bottom and evenly, and it may happen that some parts are not pasted in place during the subsequent bonding. Therefore, the present application first forms the first slot 113 in the bottom plate 111, and can fill the entire first slot 113 with bonding adhesive 130 when dispensing. Furthermore, in order to ensure that after the middle frame 120 and the backplate 110 are pasted, the bonding adhesive 130 in the first slot 113 has a sufficient amount to pass through the adhesive passage hole 150 and rise to the top surface of the middle frame 120, when dispensing adhesive into the slot 113, it is necessary to inject the bonding adhesive 130 to a height protruding from the top surface of the bottom plate 111 by 1-3 mm, that is, the injection amount of the bonding adhesive 130 is relatively large. As such, if the second slot 121 is not provided in the part of the middle frame 120 corresponding to the first slot 113 (that is, the side of the middle frame 120 in contact with the bottom plate 111 is a plane), then when the middle frame 120 is placed on the backplate 110 for pressing and bonding, a part of the bonding adhesive 130 in the first slot 113 will flow upward in the direction of the adhesive passage hole 150 due to the extrusion pressure, while the other part of the bonding adhesive 130 will directly contact the plane of the middle frame and be squeezed directly. That is, one side of the middle frame 120 does not have enough accommodation space to buffer the extrusion pressure, so this part of the bonding adhesive 130 is likely to overflow into the gap between the middle frame and the bottom plate, resulting in adhesive leakage, which increases the difficulty of cleaning, affecting the efficiency of subsequent assembly.

Of course, other rubber materials can also be used for the bonding adhesive 130. As long as the stability of the middle frame and the backplate can be guaranteed after bonding and fixing.

The depth of the first slot 113 is less than or equal to 0.2 mm. Of course, it is also possible to set the depth of the first slot 113 to be greater than 0.2 mm, and then set the side of the middle frame 120 that is in contact with the bottom plate 111 as a plane. In this way, when the middle frame 120 and the backplate 110 are pressed and bonded, the first slot 113 has a larger space for accommodating the bonding adhesive 130, so that adhesive overflowing can be avoided as much as possible.

Figure 8:
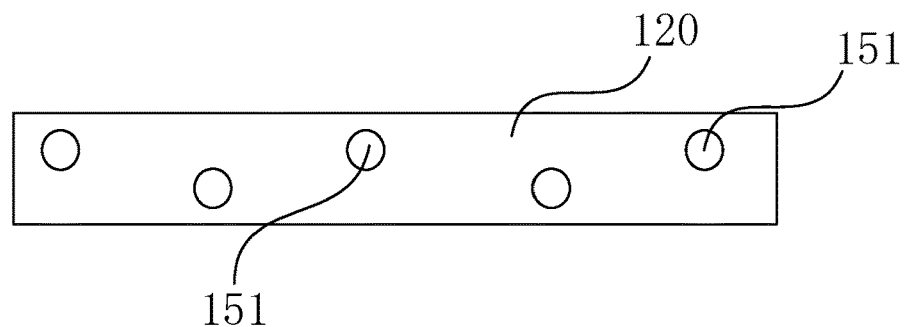
FIG. 8 is a schematic diagram of an arrangement of adhesive passage holes in the middle frame provided by the first embodiment according to the present application.

FIG. 8 is a schematic diagram of an arrangement of adhesive passage holes in the middle frame provided by the first embodiment of the present application. As shown in FIG. 8, the adhesive passage holes 150 include a plurality of sub-adhesive passage holes 151, and the plurality of sub-adhesive passage holes 151 are evenly distributed along the edge of the middle frame 120. On the one hand, they can further divert the bonding adhesive 130 in the first adhesive holding slot 140 to prevent the bonding adhesive 130 from overflowing. On the other hand, more adhesive can be saved, and the bonding adhesive 130 enters the multiple sub-adhesive passage holes 151, so that the fixing between the middle frame 120 and the backplate 110 can be achieved through a relatively small amount of bonding adhesive 130. As such, not only the bottom of the middle frame 120 is fixed to the backplate 110, but also the adhesive passage holes 150 are used for fixing to further improve the stability of the middle frame 120 and the backplate 110 after bonding, so that the middle frame 120 is not easy to fall off. Referring to FIG. 1, the distance between every two adhesive passage holes 150 is 15 mm-30 mm, which can be set according to the size of the backlight module 100, so that it can achieve a more stable effect while saving adhesive. In this embodiment, the first adhesive holding slot 140 can be formed by opening a large through slot in each of the backplate 110 and the middle frame 120, and then aligning and combining them together, so that the manufacturing process is relatively simple, and the bonding area between the backplate 110 and the middle frame 120 is relatively large, and the bonding stability is higher. Of course, it is also possible to open slots in each the backplate 110 and the middle frame 120 at intervals to form a plurality of first adhesive holding slots 140, and the plurality of first adhesive holding slots 140 correspond to the plurality of sub-adhesive passage holes 151 one by one, so that dispensing adhesive, it is only needed to dispense adhesive in each corresponding slot, which can save the amount of adhesive used while achieving stability.

It can be seen from FIG. 8 that the two sub-adhesive passage holes 151 arranged at intervals are not aligned on a horizontal line, so that the plurality of the sub-adhesive passage holes 151 are arranged in a misaligned manner in the middle frame 120 around the direction in which the middle frame 120 is arranged. That is to say, the bonding adhesive 130 in the adhesive passage hole 150 can form a stabilizing force at different positions in the adhesive passage holes 150 between the middle frame 120 and the backplate 110 after the middle frame 120 and the backplate 110 are fixed, thereby increasing the stability of the middle frame 120 and the backplate 110. Furthermore, the bonding adhesive 130 reaches the top of the middle frame 120 after passing through each sub-adhesive passage hole 151, so that after the display panel 400 is placed on the top of the middle frame 120 for bonding and fixing, it is also possible to form stabilizing forces at different positions on the bonding surface of the display panel 400, which provides a further guarantee for the stability of subsequent assembly and bonding of the display panel 400.

Further, as shown in FIG. 8, the adhesive passage hole 150 is a circular hole, so that the bonding adhesive 130 liquid overflows through the adhesive passage hole 150 more evenly. After reaching the top of the middle frame 120 and going out, the side near the display panel 400 presents a circular state and spreads around, and the adhesive formed on the top of the middle frame is also circular. In this way, the adhesion between the display panel 400 and the middle frame 120 is higher and the stability is more uniform. The diameter of the adhesive passage hole 150 is 1-2 mm. The inventor has gone through many experiments, and found that when each adhesive passage hole 150 adopts a diameter of 1-2 mm, in combination with the distance between every two adhesive passage holes 150 of 15 mm-30 mm, it can ensure that the bonding adhesive 130 in the first adhesive holding slot 140 has a good pressure when it overflows through the adhesive passage hole 150, so as to ensure the uniformity of the overflow, and the overflow speed is relatively uniform and slow, so as to prevent the bonding adhesive 130 from being rushed out of the adhesive passage hole 150 due to excessive pressure and causing outflow. Certainly, the adhesive passage holes 150 can also be in other shapes, such as rectangle, triangle or other polygons, and can also be arranged without misalignment, so that multiple adhesive passage holes 151 are arranged in a single row, which is also feasible. In addition, the adhesive passage hole 150 can also be set as a bar-shaped slot, directly passing through the middle frame 120. That is, a large through-slot is formed in the middle frame 120, and arranged around the direction in which the middle frame 120 is arranged, so that it is more convenient for the manufacturing process and can be completed directly through a single manufacturing procedure.

Figure 9:
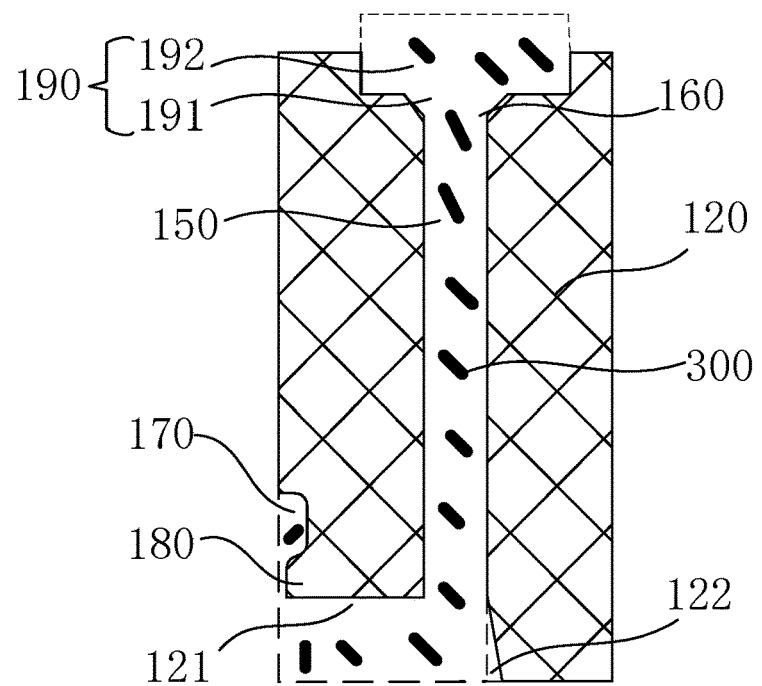
FIG. 9 is a schematic cross-sectional diagram of the middle frame provided by the first embodiment according to the present application.

FIG. 9 is a schematic cross-sectional diagram of a middle frame provided by the first embodiment of the present application. As shown in FIG. 9, in combination with FIG. 3, in order to further prevent the problem of overflowing of the bonding adhesive 130, the backlight module 100 further includes an adhesive overflow slot 170. The overflow slot 170 is disposed between the side plate 112 and the middle frame 120. The adhesive overflow slot 170 is defined in the middle frame 120 and opposite to the side plate 112.

When mounting the middle frame 120, when the bonding adhesive 130 in the first adhesive holding slot 140 is squeezed by the middle frame 120, a part of the bonding adhesive 130 will rise to the top of the middle frame 120 along the adhesive passage hole 150. However, the bonding adhesive 130 located at the joint position of the bottom plate 111 and the side plate 112 of the backplate 110 may flow in the direction of the right angle formed by the joint of the bottom plate 111 and the side plate 112 due to the effect of pressure. Due to the existence of the first adhesive holding slot 140 and the adhesive passage holes 150 diverting a part of the bonding adhesive 130, the bonding adhesive 130 flowing to the bottom plate 111 can have enough accommodation space at this time, and the possibility of overflow is low. However, the bonding adhesive 130 flowing toward the side plate 112 may flow upward along the side where the side plate 112 is in contact with the middle frame 120, and the possibility of overflow is relatively high. Therefore, setting the adhesive overflow slot 170 in the middle frame 120 can provide a buffer space for the bonding adhesive 130 flowing to the side plate 112, and prevent the bonding adhesive 130 from overflowing at this position. Furthermore, the adhesive overflow slot 170 shunts part of the bonding adhesive 130, so that the bonding adhesive 130 passing through the adhesive passage hole 150 at the same time will be relatively smaller, which also avoids the problem that the adhesive passage hole 150 is blocked by excess bonding adhesive 130. Furthermore, since the overflow adhesive slot 170 is attached to the side plate 112, the bonding adhesive 130 entering the overflow adhesive slot 170 can also be pasted with the side plate 112 and then solidified and fixed, further improving the fixation between the middle frame 120 and the backplate 110. The overflow adhesive slot 170 can also be arranged in the side plate 112, which can also prevent the bonding adhesive from overflowing. The size and shape of the overflow adhesive slot 170 can be set according to actual needs.

Due to the effect of the extrusion force, the flowing speed of the bonding adhesive 130 will be relatively accelerated. If the adhesive overflow slot 170 is completely and fully connected with the first adhesive holding slot 140, then at this time, the bonding adhesive 130 flowing toward the side plate 112 will soon be filled to the entire adhesive overflow slot 170. When the extrusion force is not reduced, this part of bonding adhesive 130 will continue to flow upwards, so at this time, the overflow adhesive slot 170 cannot prevent the bonding adhesive 130 from overflowing. Therefore, in this embodiment, a protrusion 180 is disposed between the overflow adhesive slot 170 and the first adhesive holding slot 140. A gap is formed from the protrusion 180 between the overflow adhesive slot 170 and the first adhesive holding slot 140 to the side plate 112. The overflow adhesive slot 170 is connected with the first adhesive holding slot 140 through the gap between the protrusion 180 and the side plate 112. On the one hand, the bonding adhesive 130 flowing to the side plate 112 can only slowly enter the overflow slot 170 through the gap. On the other hand, due to the existence of the protrusion 180, the bonding adhesive 130 flowing toward the side plate 112 will be blocked by the protrusion 180, and a part of the flow of the bonding adhesive 130 will be diverted in the direction of the first adhesive holding slot 140, so that more bonding adhesive 130 is squeezed and flows into the adhesive passage hole 150 and rises to the top of the middle frame 120 to provide enough bonding adhesive 130 for the subsequent bonding and fixing of the display panel 400 and the middle frame 120, so as to ensure the installation stability of the entire display device 10.

Of course, the overflow adhesive slot 170 can also be arranged in the side plate 112 and located on the side adjacent to the middle frame 120, and also be connected with the first adhesive holding slot 140 through a gap, which can also prevent the bonding adhesive 130 in the first adhesive holding slot 140 from overflowing through the gap between the middle frame 120 and the backplate 110 when the middle frame 120 and the backplate 110 are bonded and fixed.

In addition, as shown in FIG. 9, with reference to FIG. 3, the side of the second slot 121 away from the side plate 112 is a slope. That is, the slope is not perpendicular to the corresponding side of the first slot 113, and a cavity 122 with a triangular cross-section is formed between the slope and the bottom plate 111. When injecting the bonding adhesive 130 onto the backplate 110, in order to ensure that the injected bonding adhesive 130 is sufficiently squeezed and overflows into the second adhesive slot 190 through the adhesive passage 150, the adhesive should be injected to a height higher than the slot depth of the whole first slot 113. Therefore, when the middle frame 120 is placed on the backplate 110 for bonding and fixing, the bonding adhesive 130 will first flow toward the bottom plate 111 due to pressure, and then flow toward the gap between the middle frame 120 and the side plate 112 and the gap between the middle frame 120 and the bottom plate 111. At this time, after being pressed, the bonding adhesive 130 that intends to flow downward toward the gap between the middle frame 120 and the bottom plate 111 will first flow toward the slope of the cavity 122, be blocked by the cavity 122 and then flow back into the first adhesive holding slot 140.

As shown in FIG. 9, in this embodiment, a second adhesive holding tank 190 is also provided. The second adhesive-holding slot 190 is located on the side of the middle frame 120 facing away from the bottom plate 111. The second adhesive holding tank 190 is connected with the first adhesive holding slot 140 through the adhesive passage hole 150. The bonding adhesive 130 is disposed in the second adhesive holding slot 190, and the top surface of the bonding adhesive 130 protrudes from the top surface of the middle frame 120. In this way, the second adhesive-holding slot 190 can accommodate the bonding adhesive 130 overflowing from the first adhesive-holding slot 140 through the adhesive passage hole 150, so that the bonding adhesive 130 can be stored in the second adhesive-holding slot 190 after overflowing from the adhesive passage hole 150, and the bonding adhesive 130 is not easy to overflow after reaching the top of the middle frame 120, and the contact area between the bonding adhesive 130 and the middle frame 120 is increased, thereby enhancing the stability between the middle frame 120 and the backplate 110.

The second adhesive-holding slots 190 are disposed in one-to-one correspondence with the adhesive passage holes 150, which can save the amount of bonding adhesive 130 used. Furthermore, it can be seen from FIG. 9 that the second bonding adhesive 130 includes a fourth slot 191 and a fifth slot 192. The fifth slot 192 is disposed above the fourth slot 191. The area of the slot surface of the fifth slot 192 is greater than the area of the slot surface of the fourth slot 191. The area of the slot surface of the fourth slot 191 is greater than the cross-sectional area of the adhesive passage hole 150. The area of the slot surface of the fourth slot 191 gradually increases in the direction of nearing the fifth slot 192. When the bonding adhesive 130 passes through the adhesive passage hole 150 and rises to the outlet of the adhesive passage hole 150, since the adhesive passage hole 150 itself was a circular hole, the bonding adhesive 130 that arrives at the outlet of the adhesive passage hole 150 itself can present a circular shape and spread outwards. If the fourth slot 191 is not provided (that is, the fifth slot 192 directly is connected with the outlet of the adhesive passage hole 150), at this time, after the bonding adhesive 130 reaches the outlet of the adhesive passage hole 150, it will directly pour out around and spread out. The speed of diffusion will be relatively fast. All of a sudden, the bonding adhesive 130 will directly fill the entire second adhesive holding slot 190 and then continue to spread around, which will easily cause the bonding adhesive 130 to overflow. However, due to the existence of the fourth slot 191, there is still a certain distance from the outlet of the adhesive passage hole 150 to the slot surface of the fourth slot 191. When the bonding adhesive 130 reaches the outlet, it will continue to rise and spread along the slope of the fourth slot 191. At this time, the speed of spreading of the bonding adhesive 130 will be relatively slowed down and more uniform. Only after first filling the entire fourth slot 191 will it continue to diffuse to the fifth slot 192. Therefore, the possibility of overflow of the bonding adhesive 130 is relatively low, and the occurrence of overflow of the bonding adhesive 130 can be prevented.

In addition, conductive particles 300 are mixed in the bonding adhesive 130, and the bonding adhesive 130 is used to be connected to a ground wire in the display panel 400. In this way, after the display panel 400 is bonded and fixed, when the battery tape 500 is pasted on the outer wall of the backplate 110, the aluminum foil tape used may be replaced by ordinary polyester tape (PET tape for short), which greatly saves the cost of the product. The conductive particles 300 are metal conductive particles.

Embodiment 2

Figure 10:
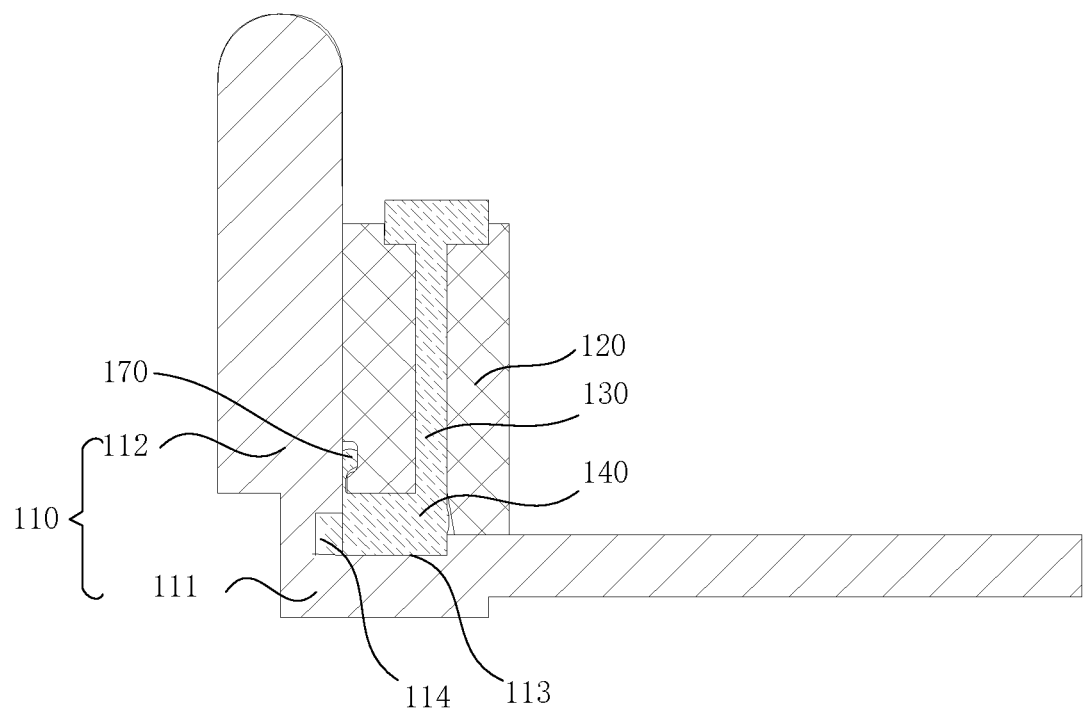
FIG. 10 is a schematic cross-sectional diagram of a backlight module provided by a second embodiment according to the present application.

FIG. 10 is a schematic cross-sectional diagram of a backlight module provided by a second embodiment of the present application. As shown in FIG. 10, the difference between this embodiment and the first embodiment is that the side of the side plate 112 corresponding to the second slot 121 is provided with a third slot 114. The first slot 113, the second slot 121 and the third slot 114 collectively form the first adhesive holding slot 140. That is, a part of the first adhesive holding slot 140 is located in the side plate 112. In this way, after injecting the bonding adhesive 130 into the first slot 113, when the middle frame 120 is placed on the backplate 110 for pressing and bonding, part of the bonding adhesive 130 in the first slot 113 will flow in the direction of the side plate 112 and then enter the third slot 114, and then slowly enters the adhesive overflow slot 170 through the gap between the protrusion 180 and the side plate 112, thereby reducing the overflow of the bonding adhesive 130 flowing in the direction of the side plate 112. Furthermore, such an arrangement can also increase the contact and bonding area between the bonding adhesive 130 and the side plate 112, thereby enhancing the stability of the bonding between the middle frame 120 and the backplate 110. Of course, in this embodiment, in order to save the bonding adhesive 130, the first slot 113 and the second slot 121 can be set relatively smaller, and correspondingly, the reduced areas of the first slot 113 and the second slot 121 can be increased to the third slot 114, so that first adhesive-receiving slot 140 formed in this way does not need to increase the amount of the injected bonding adhesive 130 as originally designed, while achieving bonding stability.

In addition, the third slot 114 can also be arranged in the side plate 112 corresponding to the first slot 113 and the second slot 121. That is, the opening of the slot formed by the first slot 113 and the second slot 121 towards the third slot 114 is substantially equal in size to the opening of the third slot 114, which also makes it more convenient for the manufacturing process.

Embodiment 3

Figure 11:
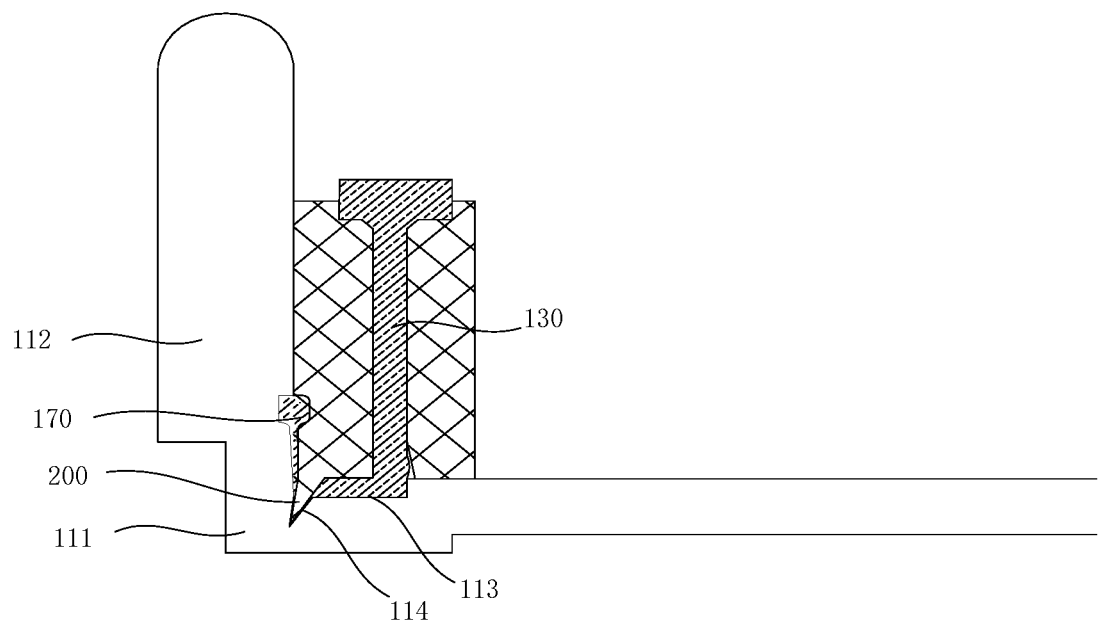
FIG. 11 is a schematic cross-sectional diagram of a backlight module provided by a third embodiment according to the present application.

FIG. 11 is a schematic cross-sectional diagram of a backlight module provided by a third embodiment of the present application. As shown in FIG. 11, the difference between this embodiment and the first and second embodiments is that the side of the middle frame 120 adjoining the backplate 110 is provided with a projection 200. The cross section of the projection 200 is triangular. A third slot 114 is provided on the side plate 112 corresponding to the projection 200, and the shape of the third slot 114 corresponds to the shape of the projection 200. In this way, when the middle frame 120 and the backplate 110 are bonded and fixed, the projection 200 is inserted into the third slot 114. Since the projection 200 is triangular and the third slot 114 fits with it, a suction force is formed between the third slot 114 and the projection 200. The projection 200 can be tightly fixed in the third slot 114 only through the contact between the two sides, with a high degree of adhesion, and the middle frame 120 and the backplate 110 are not easy to loosen and separate.

Of course, at this time, in order to relieve the bonding adhesive 130 between the projection 200 and the backplate 110 from overflowing from the gap, the adhesive overflow slot 170 can be provided in each of the middle frame 120 and the backplate 110. At least two of the overflow adhesive slots 170 can be arranged correspondingly or misplaced, so as to prevent the bonding adhesive 130 from overflowing from the gap between the backplate 110 and the middle frame 120 and at the same time enhance the stability of the bonding between the backplate 110 and the middle frame 120.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

It should be noted that the foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, and shall all be regarded as falling in the scope of protection of this application.

What is claimed is:

1. A backlight module, comprising:
   a backplate;
   a middle frame, arranged on the backplate; and
   a bonding adhesive;
   wherein a first adhesive holding slot is disposed between the backplate and the middle frame, and at least one adhesive passage hole is defined in the middle frame; wherein one end of the at least one adhesive passage hole is connected to the first adhesive holding slot, and another end of the at least one adhesive passage hole defines an opening at a top of the middle frame;
   wherein the bonding adhesive is disposed in the first adhesive holding slot, the middle frame is placed on the backplate for pressing and bonding, and the bonding adhesive in the first adhesive holding slot in the backplate flows to the opening at the top of the middle frame through the at least one adhesive passage hole and continues to spread outward, so that the bonding adhesive fills the first adhesive holding slot and the at least one adhesive passage hole and further covers the opening at the top of the middle frame, and further protrudes from a top surface of the middle frame.

2. The backlight module as recited in claim 1, wherein the backplate comprises a bottom plate and a side plate vertically connected to the bottom plate; wherein a first slot is defined in the bottom plate, and a second slot is defined in a side of the middle frame adjacent to the bottom plate, and wherein the first slot and the second slot are disposed corresponding to each other to constitute the first adhesive holding slot; or
   wherein the backplate comprises a bottom plate and a side plate vertically connected to the bottom plate, wherein a first slot is defined in the bottom plate, and a second side is defined in the side of the middle frame adjacent to the bottom plate, wherein the first slot and the second slot are disposed corresponding to each other; wherein a third slot is defined in a side of the side plate corresponding to the second slot, and wherein the first slot, the second slot, and the third slot collectively constitute the first adhesive holding slot.

3. The backlight module as recited in claim 2, further comprising an adhesive overflow slot disposed between the side plate and the middle frame.

4. The backlight module as recited in claim 3, wherein the adhesive overflow slot is defined in the middle frame and is disposed opposite to the side plate; wherein a protrusion is disposed between the overflow adhesive slot and the first adhesive holding slot, and a gap is defined between the protrusion and the side plate, wherein the adhesive overflow slot is connected to the first adhesive holding slot through the gap between the protrusion and the side plate.

5. The backlight module as recited in claim 1, wherein the at least one adhesive passage hole comprises a plurality of sub-adhesive passage holes, which are distributed along an edge of the middle frame and are disposed in a staggered manner.

6. The backlight module as recited in claim 1, wherein an end of the middle frame facing away from the bottom plate defines a second adhesive-holding slot, which is connected with the first adhesive-holding slot through the at least one adhesive passage hole, and wherein the bonding adhesive is disposed in the second adhesive-holding slot.

7. The backlight module as recited in claim 1, wherein conductive particles are mixed in the bonding adhesive, and wherein the bonding adhesive is used to be connected to a ground wire in the display panel.

8. The backlight module as recited in claim 2, wherein the at least one adhesive passage hole is circular.

9. The backlight module as recited in claim 3, wherein the adhesive overflow slot is defined in the side plate and is disposed opposite to the middle frame;
wherein a protrusion is disposed between the overflow adhesive slot and the first adhesive-holding slot, and a gap is defined between the protrusion and the middle frame, and wherein the adhesive overflow tank is connected with the first adhesive holding slot through the gap defined between the protrusion and the middle frame.

10. The backlight module as recited in claim 2, wherein a side of the second slot facing away from the side plate is a slope, which is not perpendicular to a corresponding side of the first slot, and wherein a cavity having a triangular cross-section is defined between the slope and the bottom plate.

11. The backlight module as recited in claim 8, wherein a diameter of the at least one adhesive passage hole lies in the range of 1-2 mm, and wherein a distance between every two adhesive passage holes lies in the range of 15 mm-30 mm.

12. The backlight module as recited in claim 2, wherein the second adhesive-holding slot comprises a fourth slot and a fifth slot disposed above the fourth slot, wherein an area of a slot surface of the fifth slot is greater than an area of a slot surface of the fourth slot, and wherein an area of the slot surface of the fourth slot is greater than a cross-sectional area of the at least one adhesive passage hole.

13. The backlight module as recited in claim 12, wherein the area of the slot surface of the fourth slot increases gradually in a direction of approaching the fifth slot.

14. The backlight module as recited in claim 1, wherein a projection is disposed on a side of the middle frame adjacent to the backplate, wherein a cross section of the projection is triangular, and a third slot is defined in the side plate corresponding to the projection, and wherein a shape of the third slot is congruent with a shape of the projection.

15. A display device, comprising a display panel and a backlight module, the backlight module comprising:
a backplate;
a middle frame, arranged on the backplate; and
a bonding adhesive;
wherein a first adhesive holding slot is disposed between the backplate and the middle frame, and at least one adhesive passage hole is defined in the middle frame; wherein one end of the at least one adhesive passage hole is connected to the first adhesive holding slot, and another end of the at least one adhesive passage hole defines an opening at a top of the middle frame;
wherein the bonding adhesive is disposed in the first adhesive holding slot, the middle frame is placed on the backplate for pressing and bonding, and the bonding adhesive in the first adhesive holding slot in the backplate flows to the opening at the top of the middle frame through the at least one adhesive passage hole and continues to spread outward, so that the bonding adhesive fills the first adhesive holding slot and the adhesive passage hole and further covers the opening at the top of the middle frame, and further protrudes from a top surface of the middle frame;
wherein the display panel is arranged on the top of the middle frame of the backlight module, and is bonded and fixed to the middle frame by the bonding adhesive.

16. A method of assembling a display device, comprising:
injecting a sufficient amount of bonding adhesive into a position corresponding to a first adhesive holding slot defined in a backplate;
placing a middle frame on the backplate, squeezing the bonding adhesive to bond the middle frame and the backplate together, wherein when placing the middle frame on the backplate for pressing and bonding, the bonding adhesive in the first adhesive holding slot in the backplate flows to an opening in a top of the middle frame through at least one adhesive passage hole defined in the middle frame and continues to spread outward, so that the bonding adhesive fills the first adhesive holding slot and the at least one adhesive passage hole and further covers the opening at the top of the middle frame, and further protrudes from a top surface of the middle frame; and
placing a display panel on the top of the middle frame to be fixed to the middle frame by the bonding adhesive.

* * * * *